United States Patent [11] 3,625,776

[72] Inventor Michael F. Henry
 Schenectady, N.Y.
[21] Appl. No. 889,694
[22] Filed Dec. 31, 1969
[45] Patented Dec. 7, 1971
[73] Assignee General Electric Company

[54] PREPASSIVATION-COLOR METHOD FOR DETECTING CRACKS IN METAL BODIES
 12 Claims, No Drawings
[52] U.S. Cl. .................................................. 148/6.14,
 23/230 C, 252/408
[51] Int. Cl. ................................................... C23f 5/02,
 G01n 31/00
[50] Field of Search ........................................ 148/6.14,
 6.15, 6.16, 6.2; 117/63, 66, 47 R, 8; 252/408;
 23/230 R, 230 C; 73/150

[56] References Cited
 UNITED STATES PATENTS
 2,340,940 2/1944 De Forest ................... 252/408 X
 2,707,236 4/1955 De Forest ................... 252/408 X Primary Examiner—Ralph S. Kendall
Assistant Examiner—Caleb Weston
Attorneys—Charles T. Watts, Paul A. Frank, Jane M. Binkowski, Frank L. Neuhauser, Oscar B. Waddell and Joseph B. Forman ABSTRACT: A nondestructive color method for detecting cracks in a metal body by selective corrosion of the surface portion within the cracks which includes prepassivation of the surface being tested to substantially reduce background indications. Specifically, a passivating solution is applied to the surface of the metal body to be tested and removed therefrom after a period of time sufficient to passivate its open surface portion but insufficient to significantly passivate the surface portion contained within cracks therein. A color-forming aqueous acid indicating solution is then applied to the thus passivated surface area. The indicating solution contains halide ions and a color-forming indicator and is formulated so that it does not corrode the open surface portion of the metal body but is sufficiently reactive to corrode the surface portion within cracks therein resulting in the formation of metallic ions. The color-forming indicator is of the type which reacts with the thus-formed metal ions to form a distinctive colored compound at the crack locations.

PREPASSIVATION-COLOR METHOD FOR DETECTING CRACKS IN METAL BODIES

This invention relates to a nondestructive method for detecting cracks in a metal body. In particular, the invention contemplates a process resulting in improved economy and versatility for inspection of metal bodies, whereby a clear, precise, reproducible record of the inspection results is rapidly obtained.

Metal fatigue causes 75 percent of all the serious engine failures in jet aircraft today. If adequate inspection techniques were available, these failures could be prevented. The fatigue process is a slow one; early in the process small microcracks are nucleated either at grain boundaries intersection the surface, at hard precipitate particles at or near the surface, or other surface flaws. These microcracks grow at a very slow but accelerating rate leading to a large crack which will eventually cause catastrophic failure if it remains undetected. Since the fatigue crack grows slowly, there is usually ample opportunity to detect the crack during inspection periods before it grows to a critical size.

Current crack detection techniques rarely are able to detect cracks smaller than 3 mils in depth, and in most circumstances 10 to 15 mils is usually the lower limit of detectability. With the more traditional structural alloys and conservative design, a crack can grow to much larger than this detection threshold before it becomes critical in size. But in the newer, high-temperature alloys, which have a much lower toughness and are designed for much higher stress levels, the critical crack size begins to approach the limit of detectability. Under these conditions detection techniques of the prior art are not adequate.

A typical detection process widely used in industry utilizes penetrants known in the art which include various liquids mixed with a dye in combination with a developer or blotting agent. The use of such a liquid penetrant generally comprises application of the penetrant to the surface of the metallic specimen followed by a soaking period of at least about 30 minutes to permit penetration into cracks, if any. The excess penetrant is then removed usually with a suitable solvent. A developer or blotting agent which contains a powder such as ground silica or talc, is then applied to the surface to provide a contrasting background to make the dye more visible and to blot the liquid dye out of the surface cracks by absorption. The pattern of blots shows the general location of cracks as well as other surface discontinuities.

These dye penetrant inspection procedures of the prior art have several drawbacks. They require a number of steps and are time consuming. The effectiveness of the liquid penetrant depends on its wetting properties, i.e., the penetrant must not only be able to flow into a crack but also be absorbed out of it by a developer, and therefore, cracks almost closed at their mouths would not be detected in most instances. In addition, known liquid penetrants are limited regarding temperatures at which they may be used and begin losing their penetrating power at temperatures below 70° F. due to varying surface tension and flow characteristics. Also, the blotting action of the developer depends upon its absorption of the liquid-dye penetrant. Since this absorbing action continues as long as liquid dye remains in contact with the developer, the pattern initially produced quickly becomes fuzzy and definition is lost in a matter of minutes. Moreover, the definition obtained in the dye pattern depends partly upon grain size of the developer, and since larger grain sizes produce poorer definition, developers of very uniform small grain size are required. In addition, the test specimens must be handled with care to prevent wiping off of the developer. Also, and most importantly, the mass of blots produced by conventional penetrants may be the result of normal voids or surface scratches, making the detection of structural microcracks difficult.

To avoid the use of developers, some prior art methods use a fluorescent penetrant. Typically, this comprises applying to the surface of the test body the luminescent penetrant, removing the penetrant remaining on the surface generally by solvent cleaning, and then inspecting the surface of the body in darkness under fluorescigenous radiation such as ultraviolet light or "black light" for the portion of the penetrant which had penetrated into the surface openings. The particular problem with this type of method is that many large castings and like bulky articles are not readily transported to locations which may be darkened as required for inspection. Such heavy bodies are also handled with considerable difficulty during the inspection procedure once the location is satisfactorily darkened. In addition, the sources of the required fluorescigenous radiations, almost exclusively high-intensity mercury vapor arcs, are relatively expensive special equipment. Also, some operators required to inspect test bodies continuously under such sources complain of the undesirable effect of continued eyeball fluorescence. In some applications the method is too sensitive in that it is difficult to distinguish between normal surface irregularities and structural cracks, and the result has been overinspection and excessive rejection by inexperienced operators.

The drawbacks of the prior art methods are overcome by the process disclosed and claimed in copending U.S. Pat. application Ser. No. 889,696, entitled "Color Method For Detecting Cracks In Metal Bodies" filed of even date herewith in the names of Louis F. Coffin, Jr. and Lyman A. Johnson and assigned to the assignee hereof, and which, by reference, is made part of the disclosure of the present application. The process of this copending application comprises applying to the surface of a metal body to be tested a color-forming indicating solution which will form a distinctive colored compound at crack locations in the body. Specifically, the indicating solution is an aqueous acid solution containing halide ions and a color-forming indicator. The solution is formulated so as to be too weak to corrode the open surface portion of the body, but sufficiently strong to corrode the internal surface portion contained within the cracks resulting in the formation of metallic ions within the cracks. The color-forming indicator is of the type which reacts with the thus formed metal ions to produce a distinguishing colored compound. This process can be carried out in normal light in a matter of minutes, generally up to about 15 minutes, and frequently, within shorter periods of time and does not use a developer or blotting agent. In addition, it is particularly satisfactory for detecting cracks which are closed at their mouths. This is of particular importance since parts are inspected usually in an unstressed, cold condition which commonly leaves the cracks tightly closed.

According to the present invention, a particularly clear indication of cracks can be obtained with the color process disclosed in the copending application by initially treating the surface of the metal to be tested to passivate it. Specifically, roughness or normal voids in the surface frequently cause spotty background of varying color intensity in the test for cracks and make detection of the cracks, themselves, more difficult. The present process substantially reduces such a background by initially passivating the surface to be tested, preferably using a passivating solution which is the same as the color-forming aqueous acid indicating solution used to detect cracks.

Briefly stated, the process of the present invention comprises a passivating step in combination with the color process disclosed in the copending application. Specifically, a thin coating of a passivating solution is applied to the surface to be tested, and after a short period of time, which is long enough to passivate the open surface portion of the body but not sufficient to allow significant passivation of the surface portion contained within cracks, the coating is removed. The color-forming indicating solution is then applied to the thus-passivated surface area, and within a short period of time, forms a distinctive colored compound at the crack locations in the body.

In carrying out the process of the present invention, the surface of the metal body to be tested should be initially cleaned in a conventional manner to reduce background indications so that a clearer and sharper indication of cracks can be produced. Conventional methods of cleaning metals can be used such as by wiping the surface with a suitable organic solvent to remove oils and grease or by mild grit blasting to remove adherent surface contaminants such as paint and scale.

The surface to be tested is then coated with the present passivating solution which after a specific short period of time is removed. The particular composition of the passivating solution depends largely on the type of metal being tested. It is generally an acidic solution. The passivating solution should not be of a composition, i.e., corrosive strength, which would cause any significant corrosion of the surface area being passivated, i.e., the open or free surface portion of the metal body. It should, however, be sufficiently reactive or strong to passivate the open surface portion of the metal body so that in the subsequent testing for cracks background indications caused by roughness or normal voids are substantially reduced. The acidity of the passivating solution generally falls within the same range as that useful in forming the color-forming indicating solution used for detecting cracks. If desired, the passivating solution can also contain an oxidizing agent to optimize passivation. Preferably, the passivating solution has the same composition as the color-forming indicating solution used subsequently to detect cracks.

It is believed that the present passivating solution passivates the background causing areas of the surface by forming a passive film thereon. The passivating solution is coated on the surface to be tested to form a thin continuous film. It can be applied in a conventional manner. Preferably, the coating is applied by saturating an absorbent material such as cotton with the passivating solution and rubbing it into the surface. After a short period of time which can be determined empirically, and which generally ranges up to about 15-30 seconds, the coating is removed with a conventional material such as cloth or paper so as not to break to any significant extent the just-formed passive film. The passivating solution coating should be wiped off before any significant amount of it enters a crack and thereby significantly passivates the surface portion therein. Significant passivation of the surface portion contained within the cracks would inhibit or slow down the subsequent detection of the cracks by the color-forming indicating solution. On the other hand, in some instances, the coating of the passivating solution can be allowed to air-dry if such coating does not passivate the surface portion within the cracks to the extent that it later interferes with crack detection.

After such passivation cracks are detected in the metal body by selective corrosion of the surface portion within the cracks. By corrosion, it is meant herein the dissolution of the metal by its liquid environment. The bodies of metallic material which are useful in the present invention are those generally known in the art as the type that exhibit crevice corrosion. Representative of these materials are austenitic alloy steels such as stainless steels, iron-base super alloys and the nickel-chromium-iron alloys such as those sold under the trademark of Incoloy.

The color-forming indicating solution is an electrolyte which is formulated so as not to corrode the open surface portion of the metal body, but to corrode the metal surfaces within cracks in the body. It is always an aqueous acid solution containing halide ions and a color-forming indicator. Its specific formulation is determinable empirically.

To provide the necessary acidity as well as the halide ions in forming the color-forming indicating solution, a halogen acid is preferably used, i.e., hydrochloric, hydrobromic, hydroiodic or hydrofluoric acid. Hydrochloric acid produces the best results and is preferred. Upon application of the color-forming indicating solution to the surface to be tested, the halogen acid constituent acts to corrode the surface portion within cracks to cause the formation of metal ions. The resulting positively charged metal ions hydrolyze in the surrounding electrolyte in the crack, increasing its acidity and thereby increasing the corrosion rate within the crack. In addition, the positively charged metal ions formed within the cracks attract some of the halide ions of the solution which accelerates corrosion therein. The color-forming indicator reacts with the metal ions produced by corrosion in the crack to form a distinctive colored compound at the crack locations in a matter of minutes, generally up to about 15 minutes and frequently within a shorter period of time. In contrast, acids such as sulfuric and nitric alone are not operable in the present process since they require an impracticably long period of time, usually within the range of about 20 hours, before sufficient corrosion of the metal within the crack occurs to produce a colored compound in accordance with the present invention.

The corrosive strength of the color-forming indicating solution is determined largely by the difference in the rate of corrosion between the open surface portion of the metallic material and the surface portion within a crack therein, i.e., it should be sufficiently strong to corrode the surface portion within a crack but not the open surface portion of the material to any significant extent. Since the acidity or the composition of the color-forming indicating solution is not significantly changed at the free surface portion, but the acidity of the solution does increase rapidly at the surface portion within a crack due to a number of factors such as, for example, a lack of oxygen within the crack, fairly weak acidic indicating solutions are satisfactory. The useful acidity and halide ion content of an indicating solution generally falls within a specific range for a particular metallic material so that the distinctive colored compound which indicates the crack locations is formed in a reasonable period of time, generally within about 15 minutes. The solutions of stronger acidity and/or higher halide ion content are preferably used where cracks of very small depth must be detected since these cracks corrode at a rate slower than deeper cracks. In addition, the stronger indicating solutions within a range are preferably used to locate cracks which are closed at their mouths. In this instance, the indicating solution enlarges the mouth of crack by corrosion and flows in.

Specifically, for an iron-base high-temperature alloy such as A-286(AISI 660), an aqueous acid solution useful in forming the color-forming indicating solution, as well as the passivating solution, contains hydrochloric acid in an amount ranging from about 1 to about 20 percent by volume of the aqueous acid solution (i.e., about 0.1 to about 2 Normal) with the preferred hydrochloric acid concentration ranging from about 5 to about 15 percent by volume of the solution (i.e., about 0.5 to 1.5 Normality).

In one embodiment of the present invention, the halide ion content of the indicating solution can be provided, or increased if desired, by the use of a soluble metal halide salt. This salt should be selected so that its metal ion does not form a colored compound with the color-forming indicator. Representative of such salts are alkali halide salts such as sodium chloride, potassium chloride and sodium iodide.

The color-forming indicator is one which reacts with the metal ions formed by corrosion to produce a distinctive colored compound at crack locations. For example, in the case of stainless steel, ferrous ions are formed by corrosion within the crack. One of the most satisfactory color-forming indicators for ferrous ions is potassium ferricyanide $K_3Fe(CN)_6$ which reacts with the ferrous ions to form a deep blue precipitate of ferrous ferricyanide known as Turnbull's blue. The reaction is as follows:

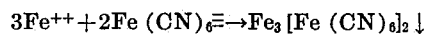

Additionally, ferric ion reacts with any ferrocyanide ion present to form a precipitate of Prussian blue as follows:

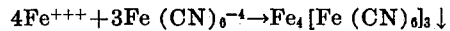

Representative color-forming indicators useful for specific metals are as follows:

| Metal | Color-Forming Indicator | Color |
| --- | --- | --- |
| Cobalt | 1,2-Diaminoanthraquinone | green-blue |

| | | |
|---|---|---|
| Cobalt | 3-sulfonic acid | green-blue |
| Cobalt | α=nitroso=β nophthol (1) and other aromatic 0=nitrosophenols | red-brown |
| Nickel | 1,2-diaminoanthraquinone | dark blue |
| Nickel | 3-sulfonic acid | dark blue |
| Nickel | dimethylglyoxime | red |
| Nickel | potassium ferrocyanide | apple green |
| Chromium | diphenylcarbazide | violet |
| Molybdenum | potassium ethylxanthate | red |
| Molybdenum | phenylhydrazine | red |
| Iron | potassium ferrocyanide | blue |
| Manganese | potassium ferrocyanide | blue |
| Zinc | potassium ferricyanide and | white |
| Titanium | pyrocatechol | yellow-red |
| Zirconium | p-dimethylaminoazophenylarsonic | brown |

Color-forming indicators for use with specific metal ions are well known in the literature. For example, an extensive list is disclosed in Feigl, F., Qualitative Analysis By Spot Tests, 3rd ed., Elsevier Pub., N.Y. 1946.

The amount of color-forming indicator is determinable empirically, and generally, amounts ranging up to about 4 grams per 100 cc. of the aqueous acid solution used in forming the indicating solution, as well as the passivating solution, are satisfactory with amounts of about 0.5 gram to about 2 grams per 100 cc. of the aqueous acid solution being preferred.

The color-forming indicating solution may be applied to the surface area of the metal body to be tested in a conventional manner such as from an eye dropper or other conventional means. After a short period of time, a distinctive colored compound will become visible at the crack locations. If desired, the part to be tested may be immersed in the color-forming indicating solution, and after a short period of time, a colored compound will become visible at crack locations.

The colored compound which indicates crack locations is easily removed. It may be removed by simply wiping it off with a cloth or paper such as Kimwipe. Generally, it can be removed most readily by applying to the colored-compound carrying surface a complexing agent and then wiping off the complexed compound. Typical complexing agents include ethylene diamine tetraacetic acid and Biguanide [$H_2NC(:NH)$]$_2NH$.

A wetting agent can be included in the color-forming indicating solution as well as the passivating solution to increase their penetrating or wetting powers. Conventional wetting agents can be used and they may be anionic, cationic or nonionic. The wetting agent should not be decomposed or degraded by the solutions to any significant extent. The amount of wetting agent used is not critical and may vary within a wide range depending on the increased penetration or wetting produced by a specific amount. Generally, satisfactory results are obtained with amounts of wetting agent ranging from about 0.01 to about 2 percent by volume of the indicating solution or passivating solution. Representative of the anionic wetting agents are sodium salts of organic sulfonates, especially alkylaryl sulfonates such as the sulfonates of dodecylbenzene, as for example, disodium-4-dodecylated oxydibenzenesulfonate. Other representative anionic surfactants include sodium alkyl-napththalenesulfonate, sodium N-methyl-N-oleyltaurate, sodium oleylisethionate and the sodium salt of sulfated nonyl phenoxypoly (ethyleneoxy) ethanol. Typical cationic surfactants include lauryltrimethylammonium chloride and octadecyltrimethylammonium chloride. Examples of nonionic surfactants are polyethylene glycol lauryl ether and tris (polyoxyethylene) sorbitan monolaurate.

The present process is not destructive or harmful since the indicating solution usually causes a rounding and blunting of the crack at its base without deepening it. This has been illustrated by micrographs of transverse sections of cracks prior to application of the present process and after such application.

The invention is further illustrated by the following examples.

In the following examples, A-286(AISI 660) an iron-base super alloy was used. This alloy is composed of Ni—26 percent, CR—15 percent, Mo—1.3 percent, Fe—balance, Ti—2 percent, Al—0.2 percent and B—0.015 percent. This metallic material is a high-temperature steel used in the aircraft industry as a disc alloy which is an application that undergoes considerable fatigue.

EXAMPLE 1

A bar of the A-286 alloy, 8 inches long, 0.5 inch wide and 0.125 inch thick was cut and a gage section was carefully surface ground in one direction. The bar was then fatigued by reverse bending to cause microcracks in the direction normal to that of the grinding direction. These microcracks could be seen under a high-powered microscope. (In normal operation, the cracks would not be distinguishable under a microscope since they usually occur in the same direction as the surface grinding marks).

An aqueous indicating solution was formed by admixing 10 ml. of concentrated hydrochloric acid (38 percent conc.), 90 ml. of distilled water, 0.1 ml. of a wetting agent sold under the trademark Aquet which is a nonionic alkyl aryl polyethylene glycol liquid and 1 gram of potassium ferricyanide. This solution was used as the passivating solution as well as the color-forming indicating solution. The solution was applied to one surface of the gage section of the bar at room temperature from an eye dropper to cover the entire surface. Within about 30 seconds a deep-blue precipitate occurred at the crack locations and was clearly visible in daylight. However, there was also considerable background indication of varying blue-colored intensity.

For comparison purposes, the above procedure was repeated on the opposite side of the gage section of the bar having the same appearance as that tested above except that this surface was initially passivated with the solution. Specifically, a clean cotton cloth was saturated with the electrolyte solution and was then rubbed across the surface area for about 10 seconds to form a thin continuous film thereon. After an additional period of about 15 seconds, it was wiped off with Kimwipe paper. The solution was then applied to the thus-treated surface area of the gage section of the bar from an ey dropper to cover the entire treated surface. Within about 30 seconds a deep-blue precipitate occurred at the crack locations and was clearly visible in daylight. There was substantially no background indications present. The blue precipitate was then cleaned off by wiping the surface with Kimwipe paper. There was no visual evidence of any significant corrosion of the surface tested.

EXAMPLE 2

The procedure used in this example was the same as that set forth in example 1 except that another bar was used and the solution was formed from 1 ml. of concentrated hydrochloric acid, (38 percent conc.), 99 ml. of distilled water, and 0.1 grams of potassium ferricyanide and 0.1 ml. of the wetting agent Aquet. Within about 15–30 seconds, a deep-blue precipitate occurred at the crack locations and was clearly visible in daylight. A significant reduction in background indications resulted by initially passivating the surface with the solution. The blue precipitate was then cleaned off by wiping the surface with Kimwipe paper. There was no visual evidence of any significant corrosion of the surface tested.

EXAMPLE 3

The procedure used in this example was the same as that set forth in example 1 except that another bar was used and the solution was formed from 20 ml. of concentrated hydrochloric acid (38 percent conc.), 80 ml. of distilled water, 2 grams of potassium ferricyanide and 0.1 ml. of the wetting agent Aquet. Within about 15–30 seconds, a deep-blue precipitate occurred at the crack locations and was clearly visible in daylight. Initial passivation of the surface resulted in substantially no background indications being present. The blue precipitate was then cleaned off by wiping the surface with Kimwipe paper. There was no visual evidence of any significant corrosion of the surface tested.

EXAMPLE 4

The procedure used in this example was the same as that set forth in example 1 except that another bar was used and the solution of example 1 was used as the passivation solution, and the solution of example 3 was used as the solution to detect cracks. A significant reduction in background indications resulted by initially passivating the surface with the solution. The blue precipitate was then cleaned off by wiping the surface with Kimwipe paper. There was no visual evidence of any significant corrosion of the surface tested.

In copending U.S. Pat. application Ser. No. 889,693, entitled "Pre-Passivation-Anodic Inhibitor-Color Method For Detecting Cracks In Metal Bodies" filed of even date herewith in the name of Michael F. Henry and assigned to the assignee hereof there is disclosed a process combining prepassivation with a color method for detecting cracks in metal bodies wherein a color-forming electrolyte containing halide ions, a color-forming indicator and an anodic inhibitor is used.

In copending U.S. Pat. application Ser. No. 889,699, entitled "Anodic Inhibitor-Color Method For Detecting Cracks In Metal Bodies" filed of even date herewith in the names of Louis F. Coffin, Jr. and Lyman A. Johnson and assigned to the assignee hereof there is disclosed a color method for detecting cracks in a metal body using a color-forming electrolyte which contains halide ions, a color-forming indicator and anodic inhibitor.

In copending U.S. Pat. application Ser. No. 889,695, entitled "Method For Detecting Cracks In Metal Bodies" filed of even date herewith in the names of Michael F. Henry and Lyman A. Johnson and assigned to the assignee hereof there is disclosed the selective corrosion of the surface portion within cracks to enlarge them sufficiently so that they can be detected by a conventional technique using a conventional liquid.

All of the above cited patent applications are, by reference, made part of the disclosure of the present application.

What is claimed is:

1. A color process for detecting cracks in a metal body by selective corrosion of the surface portion within the cracks which comprises applying to the surface of the metal body to be tested a passivating aqueous acid solution wherein the acidity is provided by an inorganic acid, said passivating solution being allowed to remain on said surface for a period of time sufficient to passivate the open surface portion of the metal body but insufficient to significantly passivate the surface portion contained within cracks therein, applying to the thus-passivated surface of the metal body a color-forming aqueous acid indicating solution containing halide ions and a color-forming indicator, said indicating solution being formulated so that it does not corrode the open surface portion of the metal body but is reactive with the surface portion within the cracks to produce metal ions, and said color-forming indicator being reactive with the resulting metal ions to produce a colored compound, said passivating aqueous acid solution having an acidity falling within the same range as that useful in forming said color-forming aqueous acid indicating solution.

2. A process according to claim 1 wherein said passivating solution is an aqueous acid containing halide ions having the same composition as the aqueous acid solution used in forming said color-forming indicating solution.

3. A process according to claim 1 wherein said passivating solution has the same composition as the said color-forming indicating solution.

4. A process according to claim 1 wherein the body is an austenitic steel.

5. A process according to claim 1 wherein said ions are chloride ions.

6. A process according to claim 3 wherein said chloride ions are provided by hydrochloric acid.

7. A process according to claim 1 wherein said passivating solution contains a wetting agent.

8. A process according to claim 1 wherein said color-forming indicating solution contains a wetting agent.

9. A process for detecting cracks in an iron-base super alloy metal body by selective corrosion of the surface portion within the cracks which comprises applying to the surface of the metal body a passivating aqueous acid solution containing chloride ions and potassium ferricyanide, said passivating solution being allowed to remain on said surface for a period of time sufficient to passivate the open surface portion of the metal body so that background indications are substantially reduced when testing for cracks but insufficient to significantly passivate the surface contained within cracks therein, applying to the thus-passivated surface of the metal body a color-forming aqueous acid indicating solution containing chloride ions and potassium ferricyanide, said color-forming aqueous acid indicating solution being formulated so that it does not corrode the open surface portion of the metal body but is reactive with the surface portion within the cracks to produce ferrous ions and said potassium ferricyanide reacting with the resulting ferrous ions to produce a blue precipitate.

10. A process according to claim 9 wherein said passivating solution has the same composition as said color-forming indicating solution.

11. A process according to claim 10 wherein each said solution is formed from about 100 cc. of 5 to 10 percent by volume aqueous hydrochloric acid solution and about 1 to 2 grams of potassium ferricyanide.

12. A process according to claim 11 wherein each said solution contains a wetting agent.

* * * * *